US011397281B2

(12) United States Patent
Radich et al.

(10) Patent No.: US 11,397,281 B2
(45) Date of Patent: Jul. 26, 2022

(54) DETERMINING A REALFEEL SEASONAL INDEX

(71) Applicant: AccuWeather, Inc., State College, PA (US)

(72) Inventors: Rosemary Radich, Wichita, KS (US); Tim Loftus, Wichita, KS (US); Jennifer Akers, Wichita, KS (US); Michael R. Root, Edmond, OK (US)

(73) Assignee: AccuWeather, Inc., State College, PA (US)

( * ) Notice: Subject to any disclaimer, the term of this patent is extended or adjusted under 35 U.S.C. 154(b) by 27 days.

(21) Appl. No.: 16/958,986

(22) PCT Filed: Dec. 28, 2018

(86) PCT No.: PCT/US2018/067993
§ 371 (c)(1),
(2) Date: Jun. 29, 2020

(87) PCT Pub. No.: WO2019/133896
PCT Pub. Date: Jul. 4, 2019

(65) Prior Publication Data
US 2020/0333507 A1  Oct. 22, 2020

Related U.S. Application Data

(60) Provisional application No. 62/611,423, filed on Dec. 28, 2017.

(51) Int. Cl.
*G01W 1/10* (2006.01)
(52) U.S. Cl.
CPC .................... *G01W 1/10* (2013.01)

(58) Field of Classification Search
CPC ...................................................... G01W 1/10
See application file for complete search history.

(56) References Cited

U.S. PATENT DOCUMENTS

2002/0128776 A1* 9/2002 Myers ..................... G01W 1/06
702/3
2017/0308915 A1* 10/2017 Jones ................... G06Q 10/087

FOREIGN PATENT DOCUMENTS

CN      108629107 A  * 10/2018
WO   WO-2017184680 A1 * 10/2017  ......... G06Q 30/0202

OTHER PUBLICATIONS

WO2017184680 English Translation (Year: 2017).*
CN108629107 English Translation (Year: 2018).*

* cited by examiner

*Primary Examiner* — Natalie Huls
*Assistant Examiner* — Michael J Singletary
(74) *Attorney, Agent, or Firm* — Perkins Cole LLP

(57) ABSTRACT

A system and method for forecasting perceived transitions to the four annual seasons in geographic areas is disclosed. The perceived transitions are identified by comparing forecasted daily temperatures in each geographic area to thresholds generated based on normal daily temperatures in those geographic areas. The forecasted daily temperatures may be calculated using both forecasted temperatures and forecasted perceived ambient temperatures (calculated using both temperature and humidity, cloud cover, sun intensity, and/or wind speed).

20 Claims, 10 Drawing Sheets

DETERMINING A REALFEEL SEASONAL INDEX

CROSS REFERENCE TO RELATED APPLICATION

This application is the U.S. national phase entry of PCT/US2018/067993, filed Dec. 28, 2018, which claims the benefit of priority of U.S. Prov. Pat. Appl. No. 62/611,423, filed Dec. 28, 2017, the entire contents of which is hereby incorporated by reference.

BACKGROUND

Many businesses, particularly in the retail industry, execute different business plans in different seasons. For example, inventory may shift or marketing and promotional materials may change from one season to the next in order to anticipate and react to customer purchasing behavior. That customer purchasing behavior, however, is not simply a function of the calendar. Instead, that customer purchasing behavior is a function of whether those customers are experiencing Winter-like, Spring-like, Summer-like, or Fall-like weather conditions.

The traditional method for businesses to anticipate when customers in geographic locations will experience each of the four seasons is to employ a weather forecasting company to make a subjective determination for each location. Specifically, meteorologists use multiple long-range weather forecasting models to generate multiple long-range weather forecasts for a geographic area and compare those long-range weather forecasts to historical weather data to identify one or more "analog years" where that geographic area experienced similar weather conditions. Using those analog years, the meteorologists will make a best guess as to the date when individuals in that geographic area will experience transitions from Winter-like to Spring-like conditions, from Spring-like to Summer-like condition, etc. Subjective seasonal forecasts may be made for each of approximately 29 climate zones. Depending on the required level of geographic specificity, those seasonal forecasts may be refined for each of the 50 states and further refined for a local geographic area.

Making a subjective seasonal forecast as described above is time consuming, and requires meteorologists with both formal training and years of experience working with weather observations, global oscillations, and climate shifts. Even with that expertise, however, subjective seasonal forecasts made using traditional methods are imprecise, especially if there is a high variance in the long-range weather forecasts produced using the long-range weather forecasting models.

Accordingly, there is a need for automated, rules-based seasonal forecasts that are more accurate and more efficient to determine than traditional subjective determinations. Additionally, given the abundance of more geographically-refined local weather data and the need for more geographically precise forecasts, there is a need for a system that can efficiently and accurately produce rules-based seasonal forecasts for smaller geographic areas than are currently available using traditional methods.

U.S. Pat. Nos. 6,768,945 and 7,251,579 describe calculating a multi-factor temperature index that uses weather-related parameters—in addition to the actual temperature recorded by a temperature measuring device—to generate a perceived ambient temperature (in other words, to describe how comfortable a person feels in that environment). The multi-factor temperature index is now known as REAL-FEEL® temperature and the weather-related parameters (in addition to temperature) used to generate the REALFEEL® temperature may be humidity, cloud cover, sun intensity, and wind speed. (REALFEEL is a registered service mark of AccuWeather, Inc.)

SUMMARY

To estimate when the perceived ambient temperatures in a geographic location will transition from one of four yearly seasons to another, the disclosed system uses the multi-factor temperature index described in U.S. Pat. Nos. 6,768,945 and 7,251,579, which are hereby incorporated by reference.

The disclosed system may be used to identify the current seasonal feel and to identify when individuals will experience a perceived change in season ("seasonal forecast"). The seasonal forecast may be forecasted for 90 days or up to one year. The seasonal forecast may be identified on a day-to-day, week-to-week, or month-to-month basis.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 1:
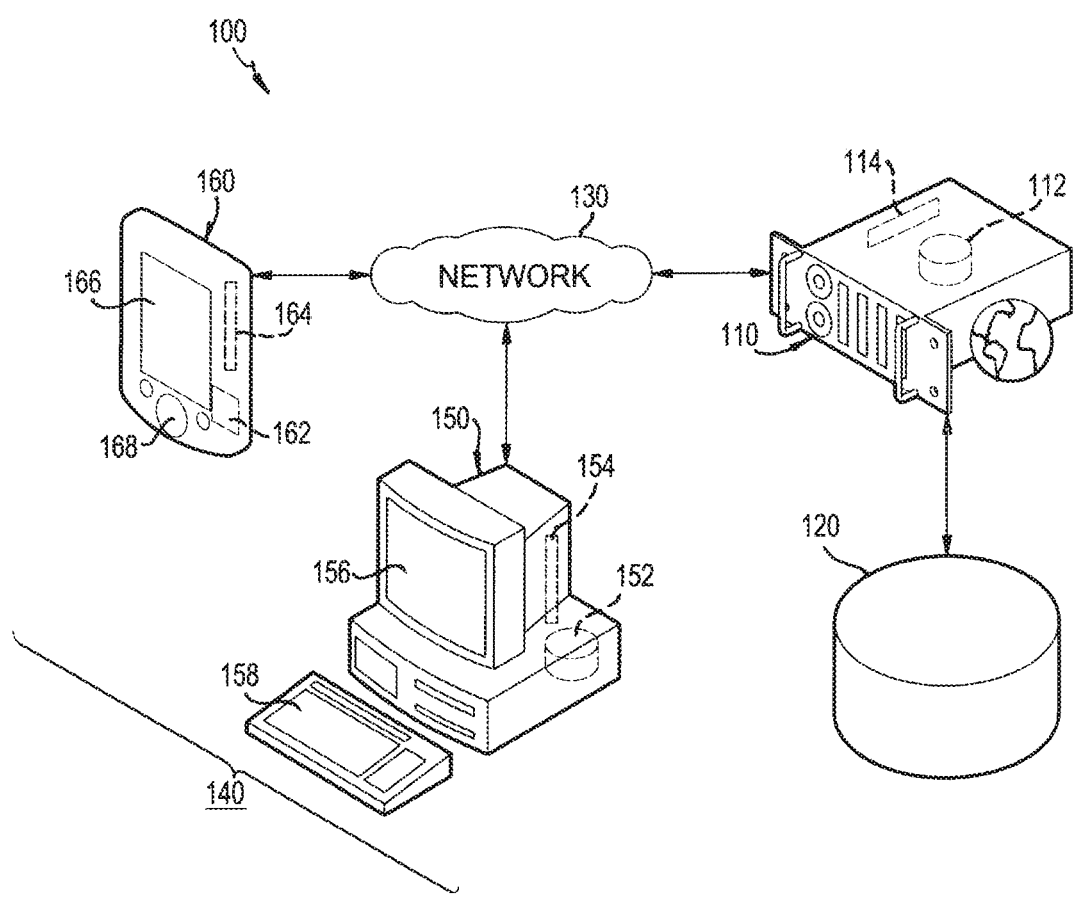
FIG. 1 is a diagram illustrating an architecture of a system for determining a RealFeel seasonal index according to an exemplary embodiment.

The disclosed system is now described in detail with reference to the drawings illustrating various views of exemplary embodiments. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram illustrating an architecture 100 of a system for determining a RealFeel seasonal index according to an exemplary embodiment.

As shown in FIG. 1, the architecture 100 may include one or more servers 110 and non-transitory computer readable storage media 120 connected to a plurality of remote computer systems 140, such as one or more personal systems 150 and one or more mobile computer systems 160, via a network 130.

The one or more servers 110 may include an internal storage device 112 and a processor 114. The one or more servers 110 may be any suitable computing device including, for example, an application server and a web server which hosts websites accessible by the remote computer systems 140.

The computer readable storage media 120 may be internal to the server 110, in which case it may be stored on the internal storage device 112, or it may be external to the server 112, in which case it may be stored on an external media, such as an external hard disk array or solid-state memory. The computer readable storage media 120 may be stored on a single device or multiple devices.

The network 130 may include any combination of the internet, cellular networks, wide area networks (WAN), local area networks (LAN), etc. Communication via the network 130 may be realized by wired and/or wireless connections.

A remote computer system 140 may be any suitable electronic device configured to send and/or receive data via the network 130. A remote computer system 140 may be, for example, a network-connected computing device such as a personal computer, a notebook computer, a smartphone, a personal digital assistant (PDA), a tablet, a notebook computer, a portable weather detector, a global positioning satellite (GPS) receiver, network-connected vehicle, etc.

A personal computer system 150 may include an internal storage device 152, a processor 154, output devices 156 and input devices 158. The one or more mobile computer systems 160 may include an internal storage device 162, a processor 164, output devices 166 and input devices 168. An internal storage device 112, 152, and/or 162 may be non-transitory computer-readable storage mediums, such as hard disks or solid-state memory, for storing software instructions that, when executed by a processor 114, 154, or 164, carry out relevant portions of the features described herein. A processor 114, 154, and/or 164 may include a central processing unit (CPU), a graphics processing unit (GPU), etc. A processor 114, 154, and 164 may be realized as a single semiconductor chip or more than one chip. An output device 156 and/or 166 may include a display, speakers, external ports, etc. A display may be any suitable device configured to output visible light, such as a liquid crystal display (LCD), a light emitting polymer displays (LPD), a light emitting diode (LED), an organic light emitting diode (OLED), etc. The input devices 158 and/or 168 may include keyboards, mice, trackballs, still or video cameras, touchpads, etc. A touchpad may be overlaid or integrated with a display to form a touch-sensitive display or touchscreen.

Figure 2:
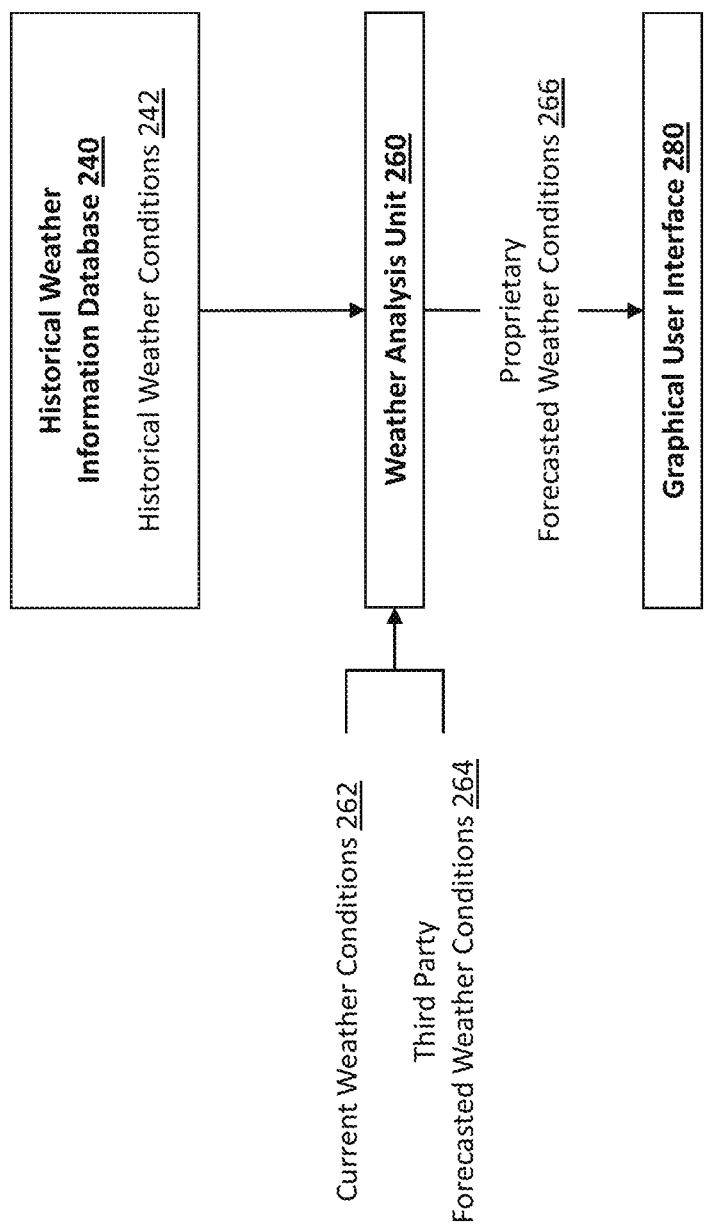
FIG. 2 is a block diagram illustrating a system for determining a RealFeel seasonal index according to an exemplary embodiment.

FIG. 2 is a block diagram illustrating a system 200 for determining a RealFeel season index according to an exemplary embodiment.

As shown in FIG. 2, the system 200 may include a historical weather information database 240, a weather analysis unit 260, and a graphical user interface 280.

The historical weather information database 240 includes geo-located and time-stamped information regarding historical (past) weather conditions 242. The historical weather conditions 242 may be received, for example, from AccuWeather, Inc., AccuWeather Enterprise Solutions, Inc., the National Weather Service (NWS), the National Hurricane Center (NHC), Environment Canada, other governmental agencies (such as the U.K. Meteorologic Service, the Japan Meteorological Agency, etc.), private companies (such as Vaisalia's U.S. National Lightning Detection Network, Weather Decision Technologies, Inc.), individuals (such as members of the Spotter Network), etc. The historical weather information database 240 may be any organized collection of information, whether stored on a single tangible device or multiple tangible devices (e.g., the computer-readable storage media 120 of FIG. 1).

The weather analysis unit 260 may be realized by software instructions accessible to and executed by the server 110 and/or downloaded and executed by the remote computer systems 140. The weather analysis unit 260 is configured to receive information from the historical weather information database 240. The weather analysis unit 260 is also configured to receive information from third parties (e.g., via the one or more networks 130 of FIG. 1), such as (geo-located and time-stamped) current weather conditions 262 and third party forecasted weather conditions 264. The third parties may include, for example, AccuWeather, Inc., AccuWeather Enterprise Solutions, Inc., and the government and private sources described above. The weather analysis unit 260 generates proprietary forecasted weather conditions 266 as described below.

The graphical user interface 280 may be any interface configured to output proprietary weather conditions 266 discussed below. The graphical user interface may include a responsive site design that allows content to be displayed on any web browser-enabled internet-connected device (e.g., a laptop, tablet, smart phone, etc.) of any brand running any operating system. Alternatively, the graphical user interface 280 may include multiple embodiments customized based on the type of computing device and/or the screen size of the remote computer system 140. For example, the graphical user interface 280 may include one embodiment customized for a remote computer system 140 such as a personal computer and another embodiment customized for a mobile computer system 160 such as a smart phone.

Figure 3:
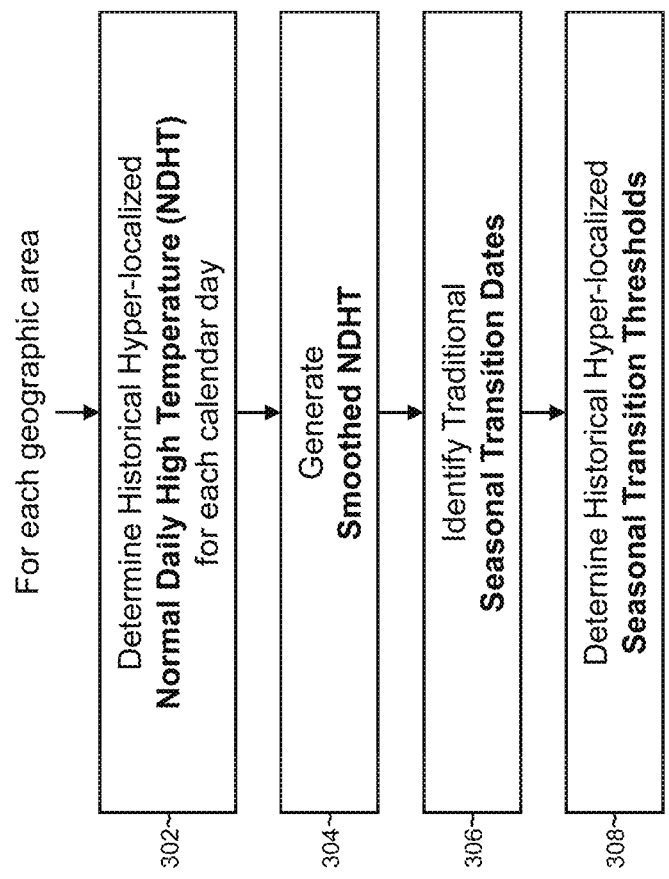
FIG. 3 is a flow chart illustrating a process for determining seasonal transition thresholds for each geographic area according to an exemplary embodiment.

FIG. 3 is a flow chart illustrating a process 300 for determining seasonal transition thresholds for each geographic area according to an exemplary embodiment. The process 300 may be performed, for example, by the weather analysis unit 260.

The historical weather conditions 242 are used to determine the normal daily high temperature (NDHT) for each day of the forecasting period in the geographic area at step 302. For example, the NDHT for each day may be a rolling average of the high temperature for that day over the previous 20 years. The forecasting period may be 90-365 days.

Because weather data is often noisy and can be difficult to smooth, a curve function (e.g., a cubic spline function) is used to smooth the normal daily high temperature (NDHT) at step 304. By using a cubic spline function, the dataset can be split by climate zone in order to smooth the daily average temperatures appropriately.

Traditional seasonal transition dates are identified at step 306. The traditional seasonal transition dates may be, for example, the winter solstice, the spring equinox, the summer solstice, and the autumnal equinox.

Historical hyper-localized seasonal transition thresholds are determined at step 308. The hyper-localized seasonal transition thresholds are the historical temperature in the geographic area when the geographic area transitions from season to season. For example, the weather analysis unit 260 may identify a time period that includes one of the traditional seasonal transition dates (e.g., a week that includes the first day of Spring) and determine the normal daily high temperature (NDHT) during that time period.

As described above, in a preferred embodiment, the weather analysis unit 260 determines the normal daily high temperature (NDHT), a smoothed normal daily high temperature (NDHT), and the smoothed daily high temperature (NDHT) during time periods that include each of the traditional seasonal transition dates. However, in alternative embodiments the weather analysis unit 260 may instead determine the normal daily maximum REALFEEL® temperature or a composite (e.g., average) of the normal daily high temperature (NDHT) and the normal daily maximum REALFEEL® temperature.

Figure 4:
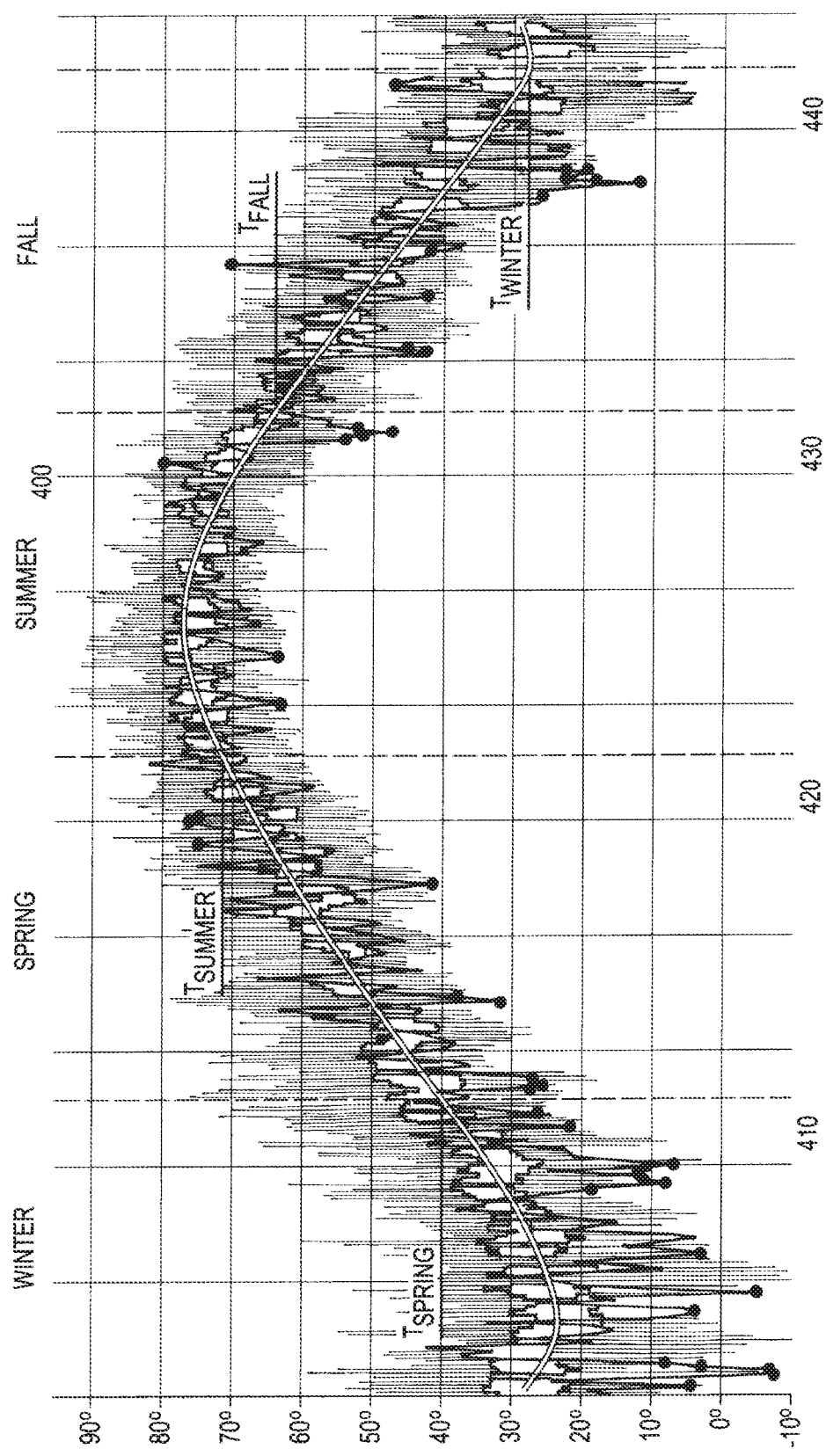
FIG. 4 is a graph illustrating the process for determining seasonal transition thresholds for the geographic area according to the embodiment described with reference to FIG. 3.

FIG. 4 is a graph illustrating the process 300 for determining seasonal transition thresholds for the geographic area according to the exemplary embodiment described with reference to FIG. 3.

As shown in FIG. 4, the y-axis is temperature (in degrees Fahrenheit) and the x-axis is each day of the forecasting period (in this example, one year). FIG. 4 also includes the smoothed normal daily high temperature (NDHT) 400. FIG. 4 also includes the traditional seasonal transition dates, including the traditional first day of Spring 410 (e.g., the Spring equinox), the traditional first day of Summer 420 (e.g., the Summer solstice), the traditional first day of Fall 430 (e.g., the Autumnal equinox), and the traditional first day of Winter 440 (e.g., the Winter solstice).

As shown in FIG. 4, the weather analysis unit 260 determines hyper-localized seasonal transition thresholds for the geographic area, including the threshold temperature for the first day of Spring $T_{SPRING}$, the threshold temperature for the first day of Summer $T_{SUMMER}$, the threshold temperature for the first day of Fall $T_{FALL}$, and the threshold temperature for the first day of Winter $T_{WINTER}$. The threshold temperature for the first day of Spring $T_{SPRING}$ may be, for example, the normal daily high temperature (NDHT) during a time period (e.g., a week) that includes the first day of Spring 410. Similarly, the threshold temperature for the first day of Summer $T_{SUMMER}$ may be the normal daily high temperature (NDHT) during a time period that includes the first day of Summer 420, the threshold temperature for the first day of Fall $T_{FALL}$ may be the normal daily high temperature (NDHT) during a time period that includes the first day of Fall 430, and the threshold temperature for the first day of Winter $T_{WINTER}$ may be the normal daily high temperature (NDHT) during a time period that includes the first day of Winter 440.

Figure 5:
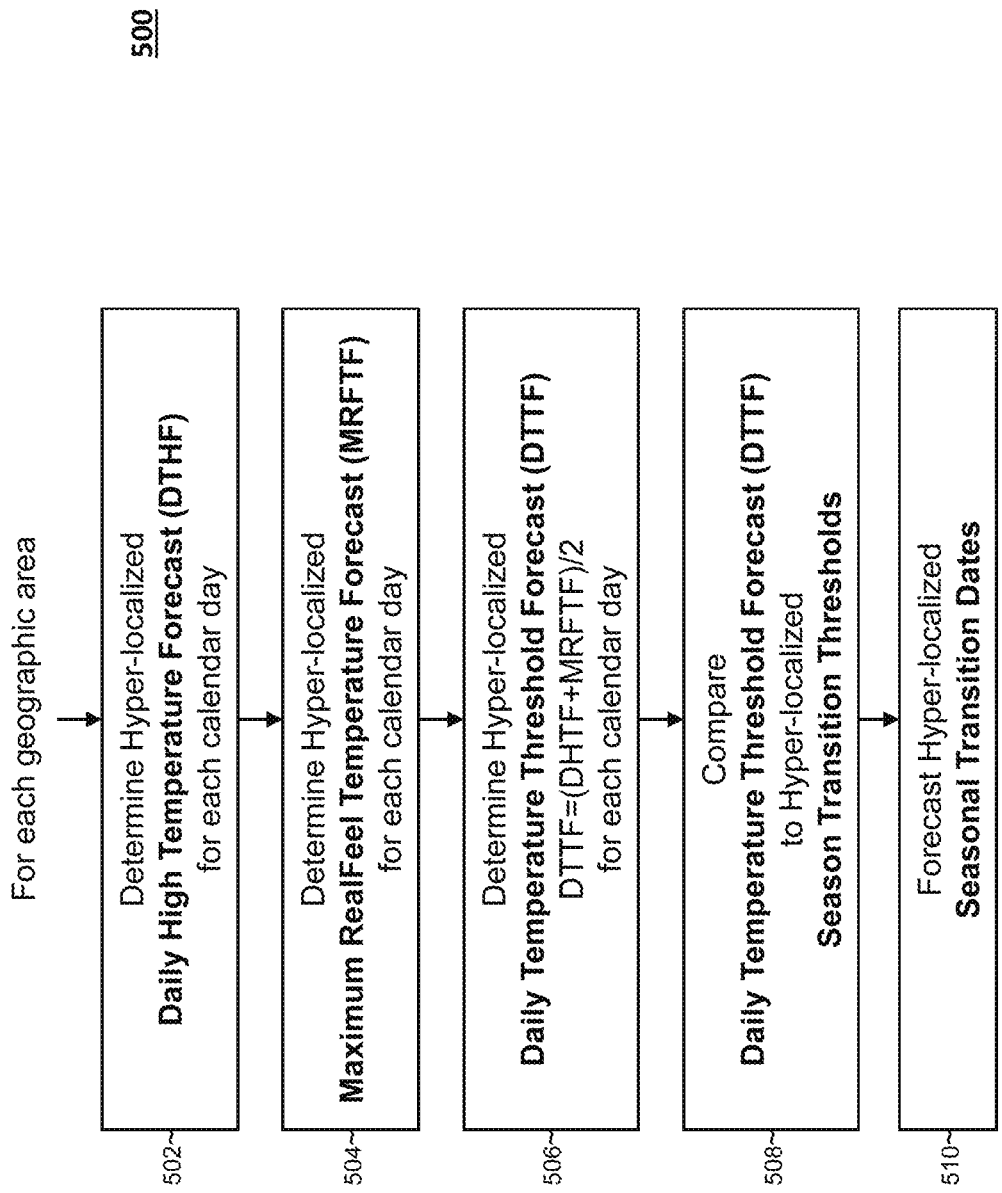
FIG. 5 is a flow chart illustrating a process for generating a REALFEEL® seasonal index according to an exemplary embodiment.

FIG. 5 is a flow chart illustrating a process 500 for generating a REALFEEL® seasonal index according to an exemplary embodiment. The process 600 may be performed, for example, by the weather analysis unit 260.

Weather forecasting models (e.g., long-term forecasting models) are used to determine the daily high temperature forecast (the "Daily High Temperature Forecast" or "DHTF") in the geographic area during the forecasting period at step 502.

The weather forecasting models are used to forecast the daily maximum REALFEEL® temperature (the "Maximum REALFEEL® Temperature Forecast" or "MRFTF") in the geographic area during the forecasting period at step 504.

The daily high temperature forecast (DHTF) and the maximum REALFEEL® temperature forecast (MRFTF) are averaged at step 506 to determine the daily temperature threshold forecast (DTTF) for each day of the forecasting period in the geographic area.

The daily temperature threshold forecast (DTTF) for the geographic area is compared to the seasonal transition thresholds $T_{SPRING}$, $T_{SUMMER}$, $T_{FALL}$, and $T_{WINTER}$ for the geographic area at step 508.

The seasonal transition dates are forecasted for the geographic area at step 510. In general, the weather analysis unit 260 determines a forecasted seasonal transition date for a geographic area by determining when the daily temperature threshold forecast (DTTF) in the geographic area meets or exceeds one of the seasonal transition thresholds $T_{SPRING}$, $T_{SUMMER}$, $T_{FALL}$, and $T_{WINTER}$ for the geographic area—i.e., when the daily temperature threshold forecast (DTTF) is equal to or greater than the seasonal transition threshold $T_{SPRING}$ or $T_{SUMMER}$ or when the daily temperature threshold forecast (DTTF) is equal to or less than the seasonal transition threshold $T_{FALL}$ or $T_{WINTER}$. However, because the daily temperature threshold forecast (DTTF) is often noisy, the weather analysis unit 260 may determine a time period (e.g., a week) when the daily temperature threshold forecast (DTTF) meets or exceeds a seasonal transition threshold for a threshold number of days (e.g., 3 days) and the weather analysis unit 260 may determine that the seasonal transition date is one of the days (e.g., the first day) during that time period.

To give one example, the weather analysis unit 260 may determine in step 308 above that $T_{SPRING}$ for Philadelphia, Pa. is 67° F., meaning that Philadelphia has to have a forecast of at least 67° F. it to feel like Spring in Philadelphia. Continuing with this example, suppose that the weather analysis unit 260 determines in step 506 above that the forecasted DTTF for Philadelphia is as shown in Table 1:

TABLE 1

| Date | DTTF | DTTF ≥ $T_{SPRING}$ |
|---|---|---|
| Mar. 1, 2019 | 58° F. | |
| Mar. 2, 2019 | 60° F. | |
| Mar. 3, 2019 | 67° F. | Yes |
| Mar. 4, 2019 | 66° F. | |
| Mar. 5, 2019 | 68° F. | Yes |
| Mar. 6, 2019 | 69° F. | Yes |
| Mar. 7, 2019 | 69° F. | Yes |

In the example shown above, because the DTTF in Philadelphia is equal to or greater than $T_{SPRING}$ for Philadelphia for three or more days during the week beginning on Mar. 1, 2019, the weather analysis unit 260 determine that seasonal transition date (i.e., the perceived first day of Spring) in Philadelphia will be Mar. 1, 2019.

Figure 6:
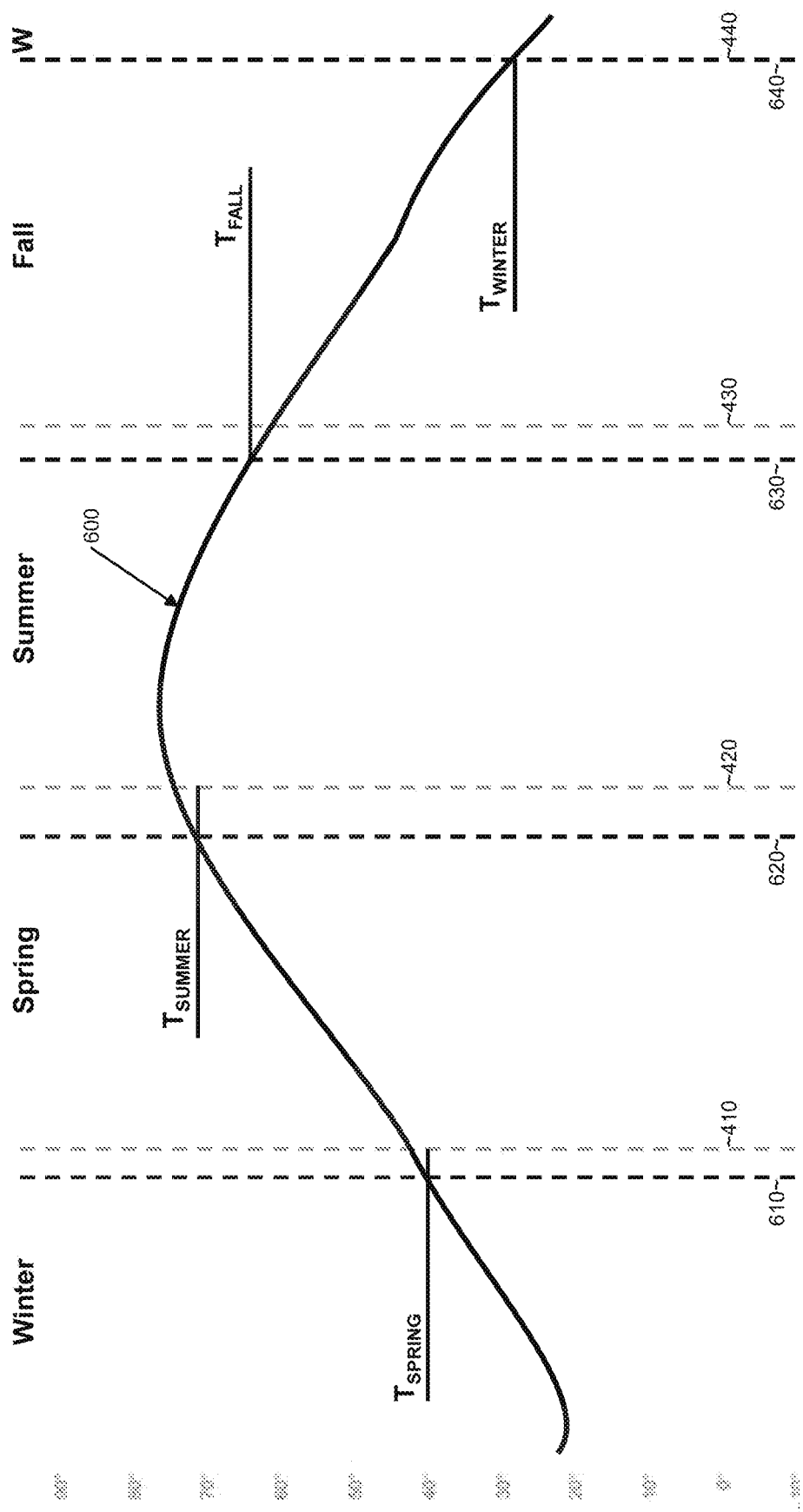
FIG. 6 is a graph illustrating the process for generating a REALFEEL® seasonal index according to the exemplary embodiment shown in FIG. 5.

FIG. 6 is a graph illustrating the process 500 for generating a REALFEEL® seasonal index according to the exemplary embodiment shown in FIG. 5.

As shown in FIG. 6, the y-axis is temperature (in degrees Fahrenheit) and the x-axis is each day of the forecasting period (in this example, one year). FIG. 6 also includes the DTTF 600 for the geographic area and the seasonal transition thresholds $T_{SPRING}$, $T_{SUMMER}$, $T_{FALL}$, and $T_{WINTER}$ for the geographic area.

By determining when the daily temperature threshold forecast (DTTF) in the geographic area meets or exceeds the seasonal transition thresholds $T_{SPRING}$, $T_{SUMMER}$, $T_{FALL}$, and $T_{WINTER}$ for the geographic area, the weather analysis unit 260 forecasts seasonal transition dates for the geographic area, including the perceived first day of Spring 610 in the geographic area, the perceived first day of Summer 620 in the geographic area, the perceived first day of Fall 630 in the geographic area, and the perceived first day of Winter 640. The perceived first day of Spring 610 may or may not differ from the traditional first day of Spring 410. Similarly, the perceived first day of Summer 620 may or may not differ from the traditional first day of Summer 420, the perceived first day of Fall 630 may or may not differ from the traditional first day of Fall 430, and the perceived first day of Winter 640 may or may not differ from the traditional first day of Summer 440.

In the embodiment described above, the daily temperature threshold forecast (DTTF) is generated based on daily high temperature forecast (DHTF) and the maximum REAL-FEEL® temperature forecast (MRFTF) and is compared to seasonal transition thresholds determined based on the normal daily high temperature. However, as one of ordinary skill in the art would recognize, similar determinations may be made with other weather metrics. For example, the daily temperature threshold forecast may be generated based on daily low temperature forecast and the minimum REAL-FEEL® temperature forecast, in which case the daily temperature threshold forecast would be compared to seasonal transition thresholds determined based on the normal daily low temperature. In each instance, the forecasted daily temperatures and/or the normal daily temperatures may include the REALFEEL® temperature, a proprietary metric. The REALFEEL® temperature may use any of a variety of weather metrics (e.g., humidity, cloud cover, sun intensity, wind, etc.) in addition to temperature to quantify the perceived ambient temperature. By using forecasted perceived ambient temperatures, the disclosed system 200 predicts perceived transitions to one of four annual seasons (i.e., Winter-like conditions, Spring-like conditions, Summer-like conditions, Fall-like conditions).

Over time, the system 200 may update the historical weather database 240 to include the recent daily temperature for each geographic area. Accordingly, the system 200 may automatically and repeatedly determine the normal daily temperature (e.g., normal daily high temperature) and seasonal transition thresholds using updated historical weather conditions 242. Similarly, in embodiments where the seasonal transition thresholds are determined at least in part based on the normal daily REALFEEL® temperature (e.g., normal maximum REALFEEL® temperature), the system 200 may update the historical weather database 240 to include the recent daily REALFEEL® temperature for each geographic area so that the system 200 may automatically and repeatedly determine the seasonal transition thresholds using updated historical weather conditions 242.

Because the disclosed system 200 is an automated, rules-based method for determining perceived transitions from one of four annual seasons to the next, those seasonal forecasts may use hyper-local forecasts and hyper-local historical data to generate those forecasts for hyper-local geographic areas. For example, low resolution Meteorological Terminal Aviation Routine (METAR) point data from approximately 1,500 point locations in the contiguous United States may be extrapolated to many more geographic locations. For example, a Kriging technique may be used on the fitted model from variography, the spatial data configuration, and the values of the measured sample points around the prediction location. This process essentially spreads the point data over a higher resolution allowing for more coverage of the data.

The disclosed system 200 can output regional or hyper-local forecasts individually or plot the hyper-local seasonal forecast data in a geographic information system (GIS) environment.

Figure 7:
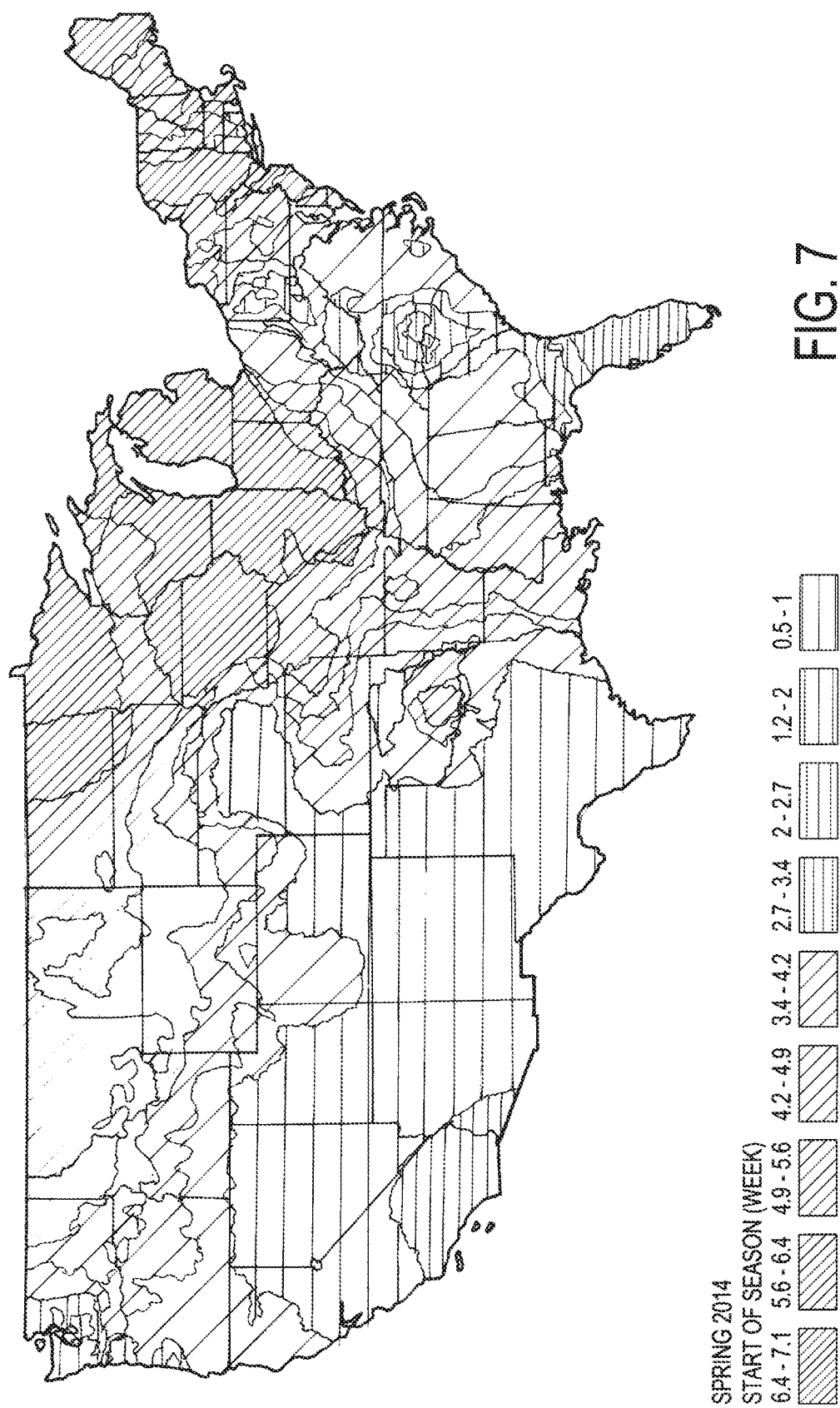
FIG. 7 is a drawing of a map illustrating the perceived first day of Spring in each geographic area across the continental United States according to an exemplary embodiment.

FIG. 7 is a drawing of a map illustrating the perceived first day of Spring 610 in each geographic area across the continental United States according to an exemplary embodiment.

Figure 8:
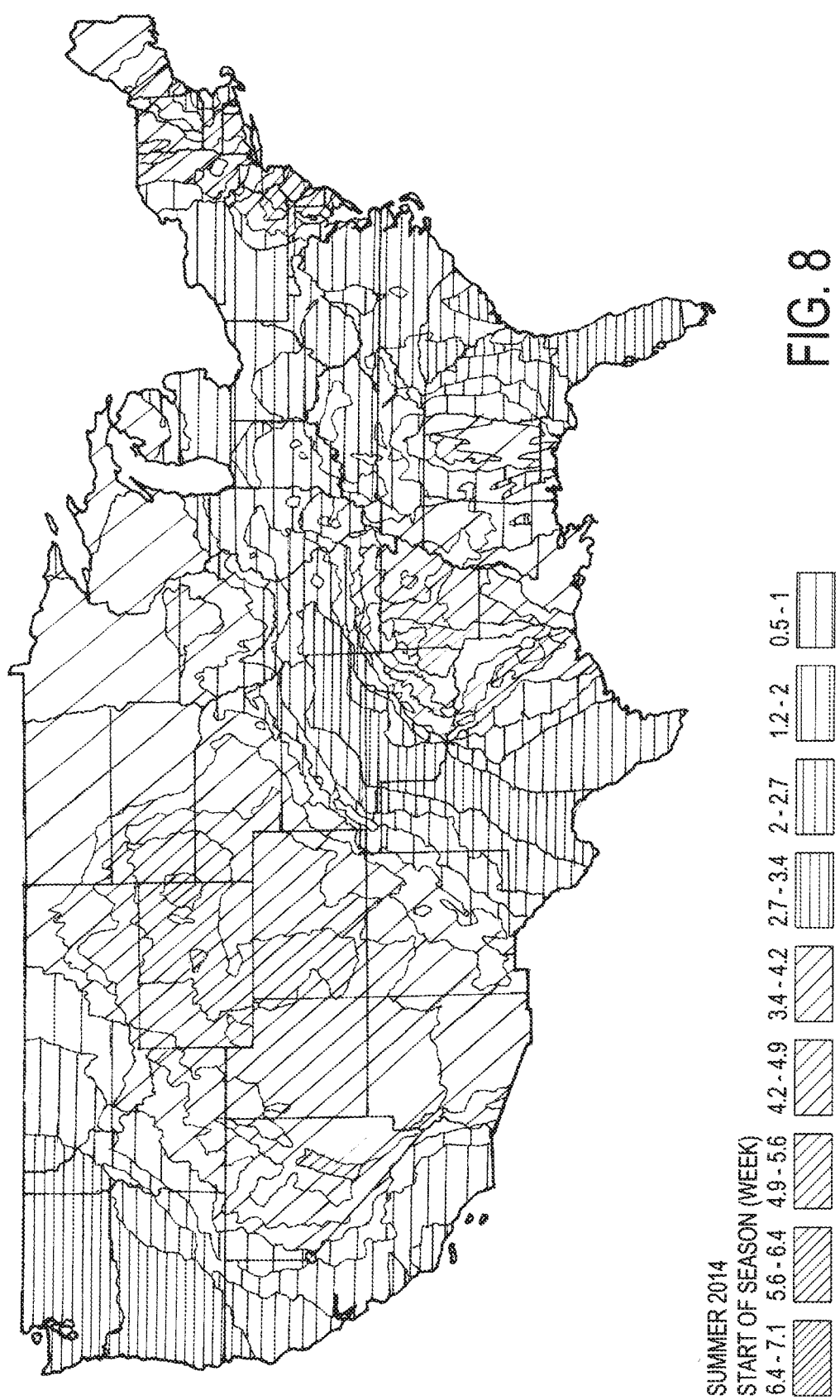
FIG. 8 is a drawing of a map illustrating the perceived first day of Summer in each geographic area across the continental United States according to an exemplary embodiment.

FIG. 8 is a drawing of a map illustrating the perceived first day of Summer 620 in each geographic area across the continental United States according to an exemplary embodiment.

Figure 9:
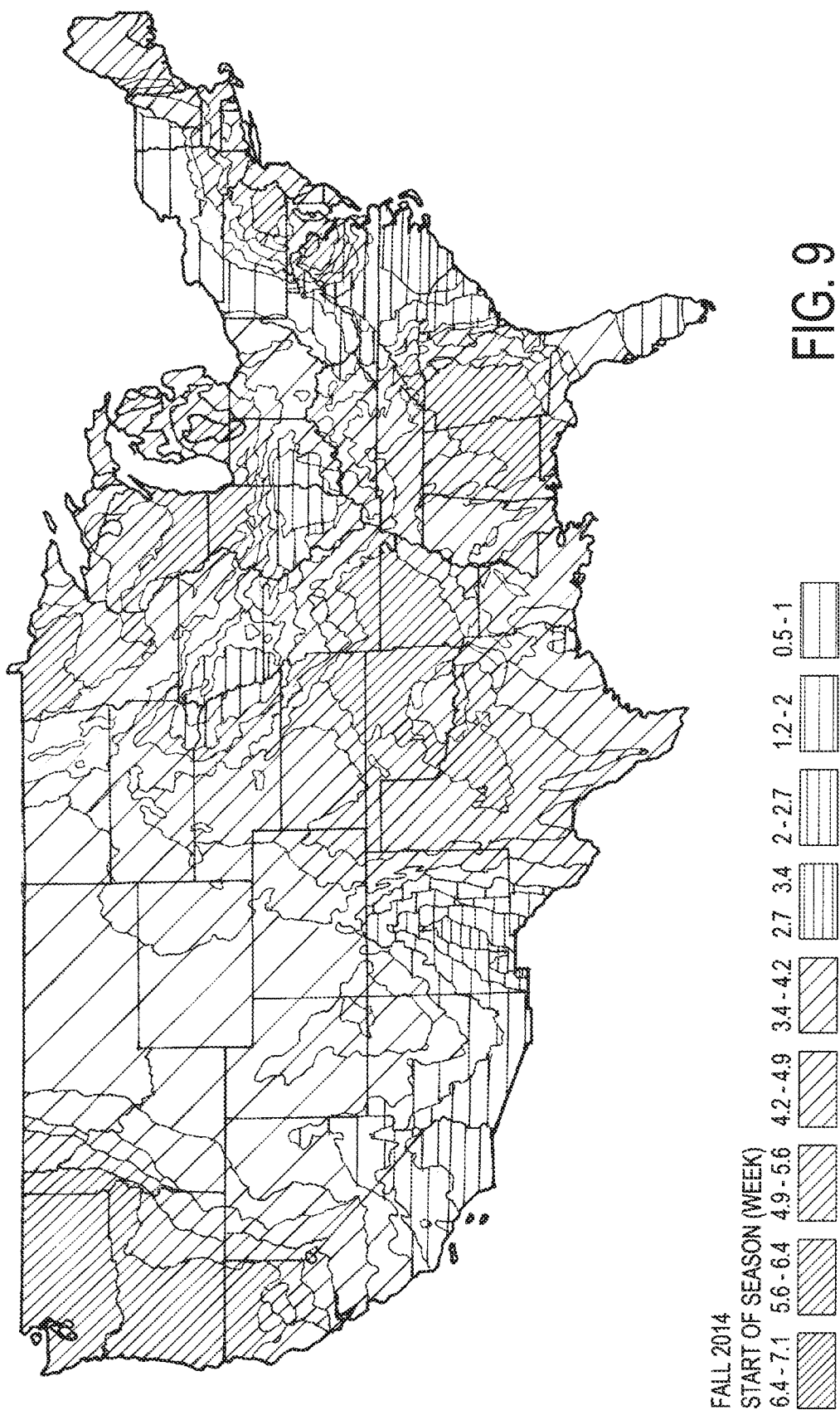
FIG. 9 is a drawing of a map illustrating the perceived first day of Fall in each geographic area across the continental United States according to an exemplary embodiment.

FIG. 9 is a drawing of a map illustrating the perceived first day of Fall 630 in each geographic area across the continental United States according to an exemplary embodiment.

Figure 10:
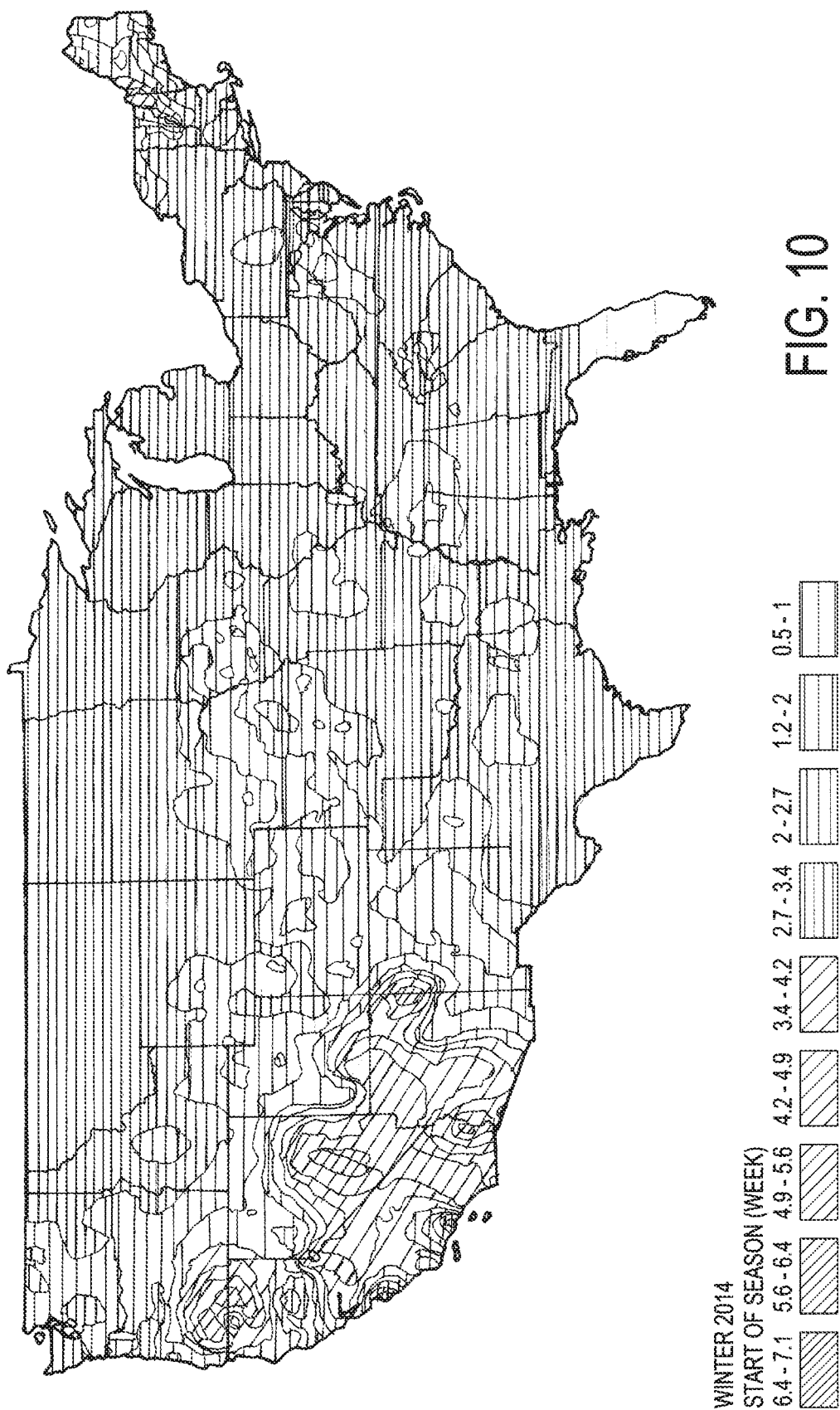
FIG. 10 is a drawing of a map illustrating the perceived first day of Winter in each geographic area across the continental United States according to an exemplary embodiment.

FIG. 10 is a drawing of a map illustrating the perceived first day of Winter 640 in each geographic area across the continental United States according to an exemplary embodiment.

As described above, in a preferred embodiment, the weather analysis unit 260 determines seasonal transition thresholds for each geographic area based on the normal daily temperature for those geographic areas. However, in other embodiments, the weather analysis unit 260 may include additional data when determining seasonal transition thresholds. For example, because perceived seasonal transitions may also be influenced by vegetation (e.g., flowers blooming, leaves falling, dry Summer and winter air), the weather analysis unit 260 may determine seasonal transition thresholds based on hyper-local historical vegetation trends in addition to the normal daily temperature. The system 200 may receive information indicative of hyper-local historical vegetation trends from third party sources, such as the U.S. Geological Survey. Accordingly, in those embodiments, the weather analysis unit 260 may determine the perceived transition to Spring and Fall in part based on the forecasted time in which the geographic area is forecasted to experience the same vegetation trend as has historically happened in that geographic area during the tradition transition to Spring and Fall. Additionally, in those embodiments, the weather analysis unit 260 may determine the perceived transition to Summer and Winter in part based on the forecasted time in which the geographic area is forecasted to experience the same precipitation as has historically happened in that geographic area during the tradition transition to Summer and Winter.

The disclosed system 200 provides a tool that clients across industries can use to have a concise view of the current seasonal conditions and upcoming seasonal transitions. Businesses in the retail industry can use the disclosed system 200 to identify when to begin shipping seasonal merchandise to locations as well as when to cease shipment of seasonal merchandise at the end of a given season. The disclosed system 200 can also be used to drive marketing efforts for seasonal merchandise in the form of targeted advertising/marketing and/or offering promotions to specific locations for clients in various industries including retail, real estate, travel, and transportation. Businesses in the energy industry can use the disclosed system 200 to identify when to expect seasonal usage peaks and drops to estimate and allocate resources.

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

The invention claimed is:

1. A method of forecasting a transition from one of four annual seasons to the next annual season in a geographic area, the method comprising:
    calculating daily temperatures in the geographic area for each day of a forecasting period using historical weather data for the geographic area, wherein the historical weather data comprises low resolution Meteorological Terminal Aviation Routine (METAR) point data;
    smoothing the daily temperatures in the geographic area during the forecasting period;
    determining a seasonal transition threshold by determining the smoothed daily temperature in the geographic area during a time period that includes a default day of transition from the one annual season to the next annual season;
    identifying forecasted daily temperatures in the geographic area during the forecasting period;
    comparing the forecasted daily temperatures in the geographic area during the forecasting period with the seasonal transition threshold for the geographic area;
    identifying the transition from the one annual season to the next annual season in the geographic area by identifying a time period during which the forecasted daily temperatures in the geographic area meet or exceed the seasonal transition threshold for the geographic area; and
    generating for display, in a user interface, a color-coded map of the geographic area, wherein the color-coding of the map is based on the time-period of the transition.

2. The method of claim 1, wherein the forecasted daily temperatures are calculated based on both the forecasted temperatures and the forecasted ambient temperatures in the geographic area for each day of a forecasting period.

3. The method of claim 2, wherein the forecasted ambient temperatures are calculated based on the forecasted temperatures and at least one of forecasted humidity, forecasted cloud cover, forecasted sun intensity, or forecasted wind speed.

4. The method of claim 1, wherein the daily temperatures are calculated based on both the temperatures and the ambient temperatures in the geographic area for each day of a forecasting period.

5. The method of claim 4, wherein the ambient temperatures are calculated based on the temperatures and at least one of humidity, cloud cover, sun intensity, or wind speed.

6. The method of claim 1, wherein the transition from the one annual season to the next annual season is identified if the forecasted daily temperatures in the geographic area meet or exceed the seasonal transition threshold for the geographic area for a threshold number of days during a predetermined time period.

7. The method of claim 6, wherein the transition from the one annual season to the next annual season is identified as one of the days of the predetermined time period if the forecasted daily temperatures in the geographic area meet or exceeds a seasonal transition threshold for the geographic area for the threshold number of days during a predetermined time period.

8. The method of claim 7, wherein the transition from the one annual season to the next annual season is identified as the first day of the predetermined time period if the forecasted daily temperatures in the geographic area meet or exceeds a seasonal transition threshold for the geographic area for the threshold number of days during a predetermined time period.

9. The method of claim 1, wherein:
    the transition from Winter to Spring in the geographic area is identified by identifying a time period during which the forecasted daily temperatures in the geographic area are equal to or greater than the Spring seasonal transition threshold for the geographic area; and
    the transition from Spring to Summer in the geographic area is identified by identifying a time period during which the forecasted daily temperatures in the geographic area are equal to or greater than the Summer seasonal transition threshold for the geographic area.

10. The method of claim 1, wherein:
    the transition from Summer to Fall in the geographic area is identified by identifying a time period during which the forecasted daily temperatures in the geographic area are equal to or less than the Fall seasonal transition threshold for the geographic area; and
    the transition from Fall to Winter in the geographic area is identified by identifying a time period during which the forecasted daily temperatures in the geographic area are equal to or less than the Winter seasonal transition threshold for the geographic area.

11. A system for forecasting a transition from one of four annual seasons to the next annual season in a geographic area, the system comprising:
    a historical weather database that stores historical weather data for the geographic area, wherein the historical weather data comprises low resolution Meteorological Terminal Aviation Routine (METAR) point data; and
    a weather analysis unit that:
        calculates daily temperatures in the geographic area for each day of a forecasting period using;
        smooths the daily temperatures in the geographic area during the forecasting period;
        determines a seasonal transition threshold by determining the smoothed daily temperature in the geographic area during a time period that includes a default day of transition from the one annual season to the next annual season;
        identifies forecasted daily temperatures in the geographic area during the forecasting period;
        compares the forecasted daily temperatures in the geographic area during the forecasting period with the seasonal transition threshold for the geographic area;
        identifies the transition from the one annual season to the next annual season in the geographic area by identifying a time period during which the forecasted daily temperatures in the geographic area meet or exceed the seasonal transition threshold for the geographic area; and
    generate for display, in a user interface, a color-coded map of the geographic area, wherein the color-coding of the map is based on the time-period of the transition.

12. The system of claim 11, wherein the weather analysis unit calculates the forecasted daily temperatures based on both the forecasted temperatures and the forecasted ambient temperatures in the geographic area for each day of a forecasting period.

13. The system of claim 12, wherein the forecasted ambient temperatures are calculated based on the forecasted temperatures and at least one of forecasted humidity, forecasted cloud cover, forecasted sun intensity, or forecasted wind speed.

14. The system of claim 11, wherein the weather analysis unit calculates the daily temperatures based on both the temperatures and the ambient temperatures in the geographic area for each day of a forecasting period.

15. The system of claim 14, wherein the ambient temperatures are calculated based on the temperatures and at least one of humidity, cloud cover, sun intensity, or wind speed.

16. The system of claim 11, wherein the weather analysis unit identifies the transition from the one annual season to the next annual season if the forecasted daily temperatures in the geographic area meet or exceed the seasonal transition threshold for the geographic area for a threshold number of days during a predetermined time period.

17. The system of claim 16, wherein the weather analysis unit identifies the transition from the one annual season to the next annual season as one of the days of the predetermined time period if the forecasted daily temperatures in the geographic area meet or exceeds a seasonal transition threshold for the geographic area for the threshold number of days during a predetermined time period.

18. The system of claim 17, wherein the weather analysis unit identifies the transition from the one annual season to the next annual season as the first day of the predetermined time period if the forecasted daily temperatures in the geographic area meet or exceeds a seasonal transition threshold for the geographic area for the threshold number of days during a predetermined time period.

19. The system of claim 11, wherein:
the weather analysis unit identifies the transition from Winter to Spring in the geographic area by identifying a time period during which the forecasted daily temperatures in the geographic area are equal to or greater than the Spring seasonal transition threshold for the geographic area; and
the weather analysis unit identifies the transition from Spring to Summer in the geographic area by identifying a time period during which the forecasted daily temperatures in the geographic area are equal to or greater than the Summer seasonal transition threshold for the geographic area.

20. The system of claim 11, wherein:
the weather analysis unit identifies the transition from Summer to Fall in the geographic area by identifying a time period during which the forecasted daily temperatures in the geographic area are equal to or less than the Fall seasonal transition threshold for the geographic area; and
the weather analysis unit identifies the transition from Fall to Winter in the geographic area by identifying a time period during which the forecasted daily temperatures in the geographic area are equal to or less than the Winter seasonal transition threshold for the geographic area.

\* \* \* \* \*